United States Patent
Goodno et al.

(10) Patent No.: US 10,008,821 B1
(45) Date of Patent: Jun. 26, 2018

(54) WAVELENGTH-SWITCHED MULTI-TURRET FIBER LASER SYSTEM

(71) Applicant: NORTHROP GRUMMAN SYSTEMS CORPORATION, Falls Church, VA (US)

(72) Inventors: Gregory D. Goodno, Los Angeles, CA (US); Joshua E. Rothenberg, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 47 days.

(21) Appl. No.: 15/422,247

(22) Filed: Feb. 1, 2017

(51) Int. Cl.
| | |
|---|---|
| *H01S 3/00* | (2006.01) |
| *H01S 3/067* | (2006.01) |
| *G02B 6/28* | (2006.01) |
| *G02F 1/39* | (2006.01) |
| *G02F 1/01* | (2006.01) |
| *H01S 3/10* | (2006.01) |
| *H01S 3/23* | (2006.01) |

(52) U.S. Cl.
CPC ............ *H01S 3/06758* (2013.01); *G02B 6/28* (2013.01); *G02F 1/0136* (2013.01); *G02F 1/395* (2013.01); *H01S 3/06783* (2013.01); *H01S 3/10007* (2013.01); *H01S 3/2308* (2013.01); *H01S 3/2383* (2013.01); *H01S 3/06754* (2013.01)

(58) Field of Classification Search
CPC ... H01S 3/06754; H01S 3/2383; H01S 3/2308
USPC ......................................................... 359/349
See application file for complete search history.

(56) References Cited

U.S. PATENT DOCUMENTS

| | | | | |
|---|---|---|---|---|
| 7,346,085 | B1 * | 3/2008 | Rothenberg | ....... G02B 27/0087 372/29.016 |
| 7,436,588 | B2 * | 10/2008 | Rothenberg | ....... B23K 26/0604 359/349 |
| 8,184,363 | B2 | 5/2012 | Rothenberg | |
| 8,488,235 | B2 | 7/2013 | Rothenberg | |

(Continued)

OTHER PUBLICATIONS

Pati, Bhabana et al. "High Power WDM with Narrow Wavelength Separations" CREOL, College of Optics and Photonics, University of Central Florida, US, CLEO, OSA, 2015, 2 pgs.

(Continued)

*Primary Examiner* — Mark Hellner
(74) *Attorney, Agent, or Firm* — John A. Miller; Shumaker, Loop & Kendrick, LLP (57) ABSTRACT

A fiber amplifier system including a plurality of seed beam sources each generating a seed beam at a different wavelength and a selection switch selectively outputting the seed beams on one or more outputs. The system also includes a plurality of fiber amplifiers each receiving one of the selected seed beams from the selection switch and a plurality of wavelength division multiplexers (WDMs) where a separate WDM receives an amplified beam from a fiber amplifier, each WDM providing the amplified beam on a separate output depending on the wavelength of the selected beam. The system further includes a plurality of beam directors each being coupled to each WDM, where one of the beam directors receives all of the amplified beams on the delivery fibers from each of the WDMs depending on the selected seed beam, each beam director combining the beams using CBC or SBC into a combined output beam.

20 Claims, 6 Drawing Sheets

(56) References Cited

U.S. PATENT DOCUMENTS 8,922,771 B2  12/2014  Goodno et al.
8,922,772 B2  12/2014  Goodno et al.
9,362,714 B1   6/2016  Goodno et al.
9,735,537 B1 *  8/2017  Rothenberg .......... H01S 3/2391

OTHER PUBLICATIONS

Lumeau, Julien et al. "Near-IR Absorption in High-Purity Photothermorefractive Glass and Holographic Optical Elements: Measurement and Application for High-Energy Lasers" Applied Optics, vol. 50, No. 30, Oct. 20, 2011, pp. 5905-5911.
Jain, Apurva et al. "Passive Coherent Locking of Fiber Lasers using Volume Bragg Gratings" Fiber Lasers VII: Technology, Systems and Applications, Proc. of SPIE vol. 7580, 2010, pp. 75801S-1-75801S-9.

* cited by examiner

WAVELENGTH-SWITCHED MULTI-TURRET FIBER LASER SYSTEM

BACKGROUND

Field

This invention relates generally to a fiber laser amplifier system that provides a high power output beam and, more particularly, to a fiber laser amplifier system that is operable to quickly switch a high power output beam between spaced apart beam directors by altering seed beam wavelengths for both spectral beam combining (SBC) and coherent beam combining (CBC) architectures.

Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam to amplify the seed beam and generate the laser output beam, where the fiber typically has an active core diameter of about 10-20 μm.

Improvements in fiber laser amplifier designs have increased the output power of the fiber amplifier to approach its practical power and beam quality limit. To further increase the output power some fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot. Focusing the combined beam to a small spot at a long distance (far-field) defines the quality of the beam.

One known method for generating high power, near diffraction-limited beams for directed energy lasers is to utilize spectral beam combining (SBC) or coherent beam combining (CBC) of multiple narrow-line width fiber amplifiers. Typically, the size, weight and misalignment sensitivity of the beam combining optics scale directly with the number of fibers. Hence, maximizing power per fiber enables scaling to higher system powers in smaller and more robust packages. However, it is difficult to scale individual fiber laser amplifier powers above a few kilowatts because of numerous physical and engineering limitations, such as stimulated Brilluoin scattering (SBS), self phase modulation (SPM), spatial mode instabilities, thermal limits on pump power handling and diode pump brightness.

In SBC and CBC laser architectures, light emitted from a laser system comprising an array of fiber amplifiers is combined into a single free space beam. For many directed energy (DE) laser systems, such as weapons systems, particularly those related to air platform self-defense, it is advantageous to emit beams from multiple beam directors on the platform to provide enhanced field of regard and protect against threats arriving from any angle. In order to minimize payload size and weight, it is also advantageous to deploy only a single laser system. Hence, there is a need to quickly and efficiently switch laser power between multiple beam directors that transmit the output beam in different directions. At DE-class power levels, typically 100 kW or more, a free space optical switch, such as using one or more moving mirrors positioned downstream of an SBC or CBC beam combiner, will be impractical for numerous reasons, including the need to route high power line-of-sight beams through the interior of the platform, large projection distances that cause susceptibility to static and dynamic beam drifts and platform-induced jitter, and large free space optics that are susceptible to contamination and laser-induced damage. While these issues are significant, the need for line-of-sight routing imposes the most severe constraint against integration on combat air platforms. Hence, there is a need for a high power laser architecture that is switchable between multiple output directors with flexible routing, fast switching speeds (<100 ms) to support agile re-targeting against multiple threats, and insensitivity to platform deformations or contamination environments.

U.S. Pat. No. 8,488,235 issued Jul. 16, 2013 to Rothenberg, assigned to the assignee of this application and herein incorporated by reference, discloses a fiber laser system that scales per-fiber power by coherently combining the outputs of several fiber amplifiers into a single delivery fiber, which can then be fed to free-space optical beam combiners based on either SBC or CBC. In this system, a tapered fiber bundle (TFB) fiber splitter is employed in reverse as a fiber combiner, where each input fiber to the TFB combiner is spliced to the output of a fiber amplifier. If the amplifier outputs are mutually coherent and properly phase-locked and polarization-locked using servo-control techniques, then near-100% of the input light can be combined into any one of the optic delivery fibers from the TFB combiner. The TFB combiner beam output can be directed through coherent switching to any of the output delivery fibers by changing the piston phases between the inputs. Multiple TFB combiners can be arranged to enable a single laser system to feed multiple SBC or CBC beam directors.

While the laser system disclosed by the '235 patent has many advantages, it may not be optimum for all DE laser system architectures, whether based on CBC or SBC. For example, it may be advantageous to configure a CBC architecture as a tiled phased array to enable high speed, all-electronic beam steering for aim-point maintenance on target. In such a tiled configuration, it is advantageous to maintain as many laser tiles as practicable to provide the largest possible pointing control range, which scales directly with the number of laser tiles. The architecture disclosed in the '235 patent results in a reduction of the number of laser tiles by a factor equal to the number of beam directors, where switching between three directors would reduce the number of tiles, and the beam steering range, by three times as compared to the number of fiber amplifiers.

Another potential drawback of the '235 system is that the power in the delivery fiber is increased by a factor equal to the number of beam directors M over that of any individual amplifier. This can enhance nonlinear optical impairments, e.g., self phase modulation and stimulated Brilluoin scattering, that either reduce the combining efficiency for the CBC architecture, or degrade beam quality for the SBC architecture, or directly limit the power output. To avoid significant performance limitations from such non-linear impairments, it is typically necessary to limit the routing fiber lengths to be less than 10 m, which may be insufficient for some applications, or to limit per-fiber power, which can increase system payload size and weight by requiring more fiber amplifiers.

A further potential drawback of the '235 system is that it requires coherence between the laser channels that are to be combined and switched. This imposes additional system complexity when used to feed a subsequent set of beam combiners based on SBC architecture, since CBC architecture control electronics must also be included in the laser system. It also imposes superfluous combining loss in the form of decohered light, which will be lost in the TFB, but which could have otherwise contributed to the brightness of the SBC output beam.

DETAILED DESCRIPTION OF THE EMBODIMENTS

The following discussion of the embodiments of the invention directed to a fiber laser amplifier that is operable to quickly switch a high power output beam between spaced apart beam directors by altering seed beam wavelengths for both spectral beam combining (SBC) and coherent beam combining (CBC) architectures is merely exemplary in nature, and is in no way intended to limit the invention or its applications or uses.

Figure 1:
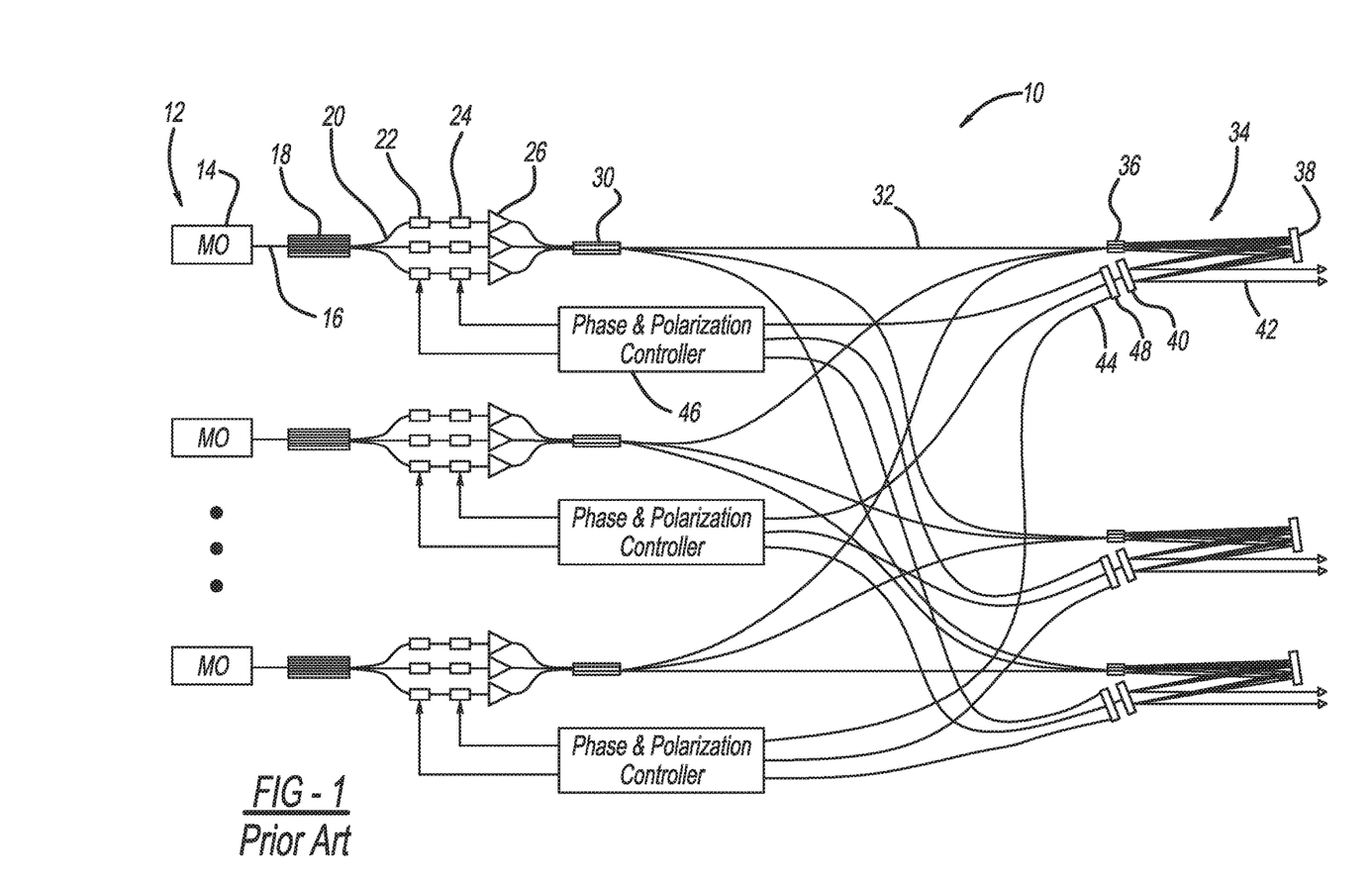
FIG. 1 is a schematic diagram of a known fiber laser amplifier system employing SBC.

FIG. 1 is a schematic diagram of a known fiber laser amplifier system 10 that employs SBC of the type disclosed in the '235 patent referenced above. The system 10 includes a number of wavelength channels 12 each including a master oscillator (MO) 14 that generates a seed beam on a fiber 16 at a particular wavelength λ, where each MO 14 generates a different wavelength, a beam splitter 18 that splits the seed beam into a number of fiber seed beams provided on fibers 20, a phase modulator 22 for controlling the phase of each of the fiber beams so that all of the fiber beams are coherent, and a polarization modulator 24 that controls the polarization of each of the fiber seed beams so all of the beams are co-polarized. Each of the fiber beams are sent to a fiber amplifier 26, where the amplifier 26 will typically be a doped amplifying portion of the fiber 20 that receives an optical pump beam (not shown).

All of the coherent and co-polarized amplified fiber seed beams are then provided to a TFB combiner 30 that combines the fibers 20 into a combined fiber mass, where all the fiber seed beams are coherently combined into a single combined beam in a manner well understood by those skilled in the art. It is noted that although the discussion herein is specific to a TFB combiner, other types of fiber-coupled combiners that include fiber inputs, a central mixing section where the fiber beams are combined and output fibers could also be applicable. The mixing section could include free space optics, such as a beam splitter with fiber—coupled inputs and outputs, or any suitable evanescent waveguide coupler. Each output fiber of each of the TFB combiners 30 is coupled to a delivery fiber 32, where a separate one of each of the delivery fibers 32 from each of the TFB combiners 30 in each optical input channel 12 is sent to a separate beam combiner director 34. In this non-limiting embodiment merely for discussion purposes, each of the optical input channels is split into three fiber beams so that there are three delivery fibers 32 for each TFB combiner 30. As discussed in the '235 system, the phase of the combined beam in the TFB combiner 30 can be controlled so that most of the beam power is directed to any one of delivery fibers 32 so that all of the combined beams at the different wavelengths in the channels 12 can be sent to the same beam combiner director 34 to be spectrally combined.

An output delivery fiber 32 from each of the TFB combiners 30 is coupled to a fiber launcher array 36 in the particular director 34 that directs the beams from the delivery fibers 32 to an optical system including a spectral beam combining (SBC) grating 38 that spatially combines the beams having the different wavelengths and redirects the combined beams to a beam sampler 40. Most of the spectrally combined beam is reflected from the beam sampler 40 as an output beam 42 from the system 10. However, a portion of the beam from the SBC grating 38 propagates through the beam sampler 40 and is wavelength-filtered by a wavelength selective element 48. The wavelength filtered beam samples are coupled into a set of sample fibers 44 and are then provided to a multichannel phase and polarization controller 46 in each wavelength channel 12. Each of the phase and polarization controllers 46 includes suitable mixing optics, photodetectors for converting optical signals to electrical signals, and control algorithms. Also, although each controller 46 is shown and described as a phase and polarization controller, the controllers 46 can actually be separate controllers, where one controller provides phase control and one controller provides polarization control. Each of the controllers 46 will select only one of the sample beams from the sample fibers 44 from one of the directors 34 for feedback control, thus determining the output beam 42 that carries the high power laser energy. In a conventional polarization controller, it is necessary to detect the individual polarized powers of the separate beams in the combined beam to provide polarization control separately in the fibers 20. As discussed above, these known techniques employ coherent de-multiplexing to separate the separate coherent signals to identify three separate polarized power measurements of the individual beams in the combined beam. Each of the separately identified polarized power measurements are used to generate control signals that are then independently provided to the particular polarization modulator 24 by the phase and polarization controller 46.

Figure 2:
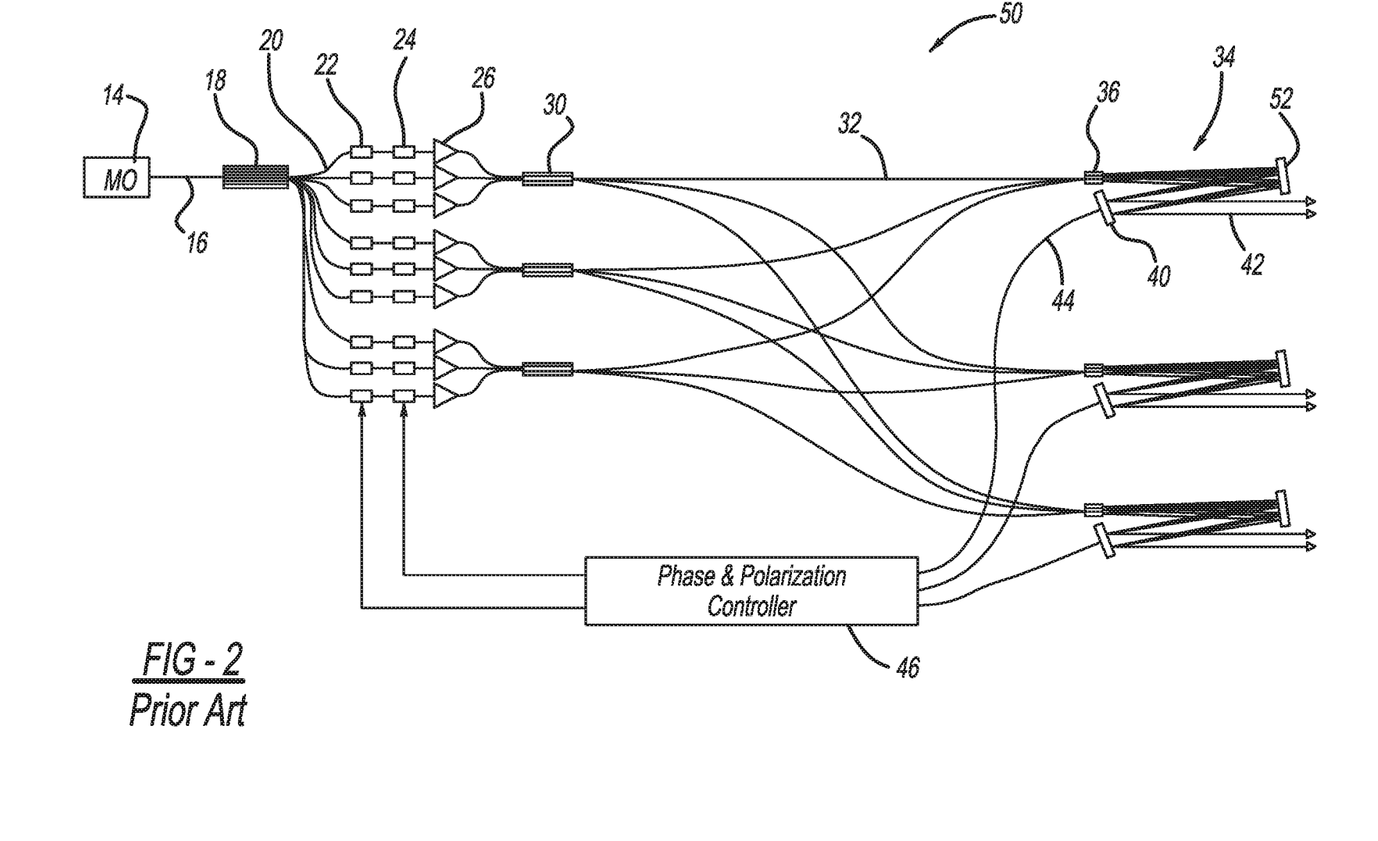
FIG. 2 is a schematic diagram of a known fiber laser amplifier system employing CBC.

The fiber laser amplifier system 10 employs the beam combiner directors 34 based on the SBC for multiple wavelength signals as discussed. For an alternate embodiment, FIG. 2 is a schematic diagram of a known fiber laser amplifier system 50 that employs beam combiner directors based on CBC well known to those skilled in the art, where like elements to the amplifier system 10 have the same reference number. In the system 50, only a single MO 14 is employed so that all of the beams have the same wavelength. Further, the beam combiner directors 34 include a CBC optical system 52 that coherently combines the beams from the separate delivery fibers 32 in a manner well understood by those skilled in the art. The CBC optical system 52 can be, for example, an optical telescope coupled to a diffractive optical element (DOE) beam combiner. Since there is only one optical channel and a single wavelength, only a single phase and polarization controller 46 is necessary.

The present invention proposes a fiber laser amplifier system that integrates a passive wavelength selective component, such as a wavelength division multiplexer (WDM), at the output of each fiber amplifier so that the output power can be switched between two or more output fiber paths by switching the operating wavelength of a particular seed source for the laser amplifier system. Depending on its emission wavelength, each output or delivery fiber is routed to a particular remote beam director. The switched fiber laser system of the invention does not suffer from the limitations of either free space beam switches or coherently switched architecture as does the fiber laser systems 10 and 50.

Figure 3:
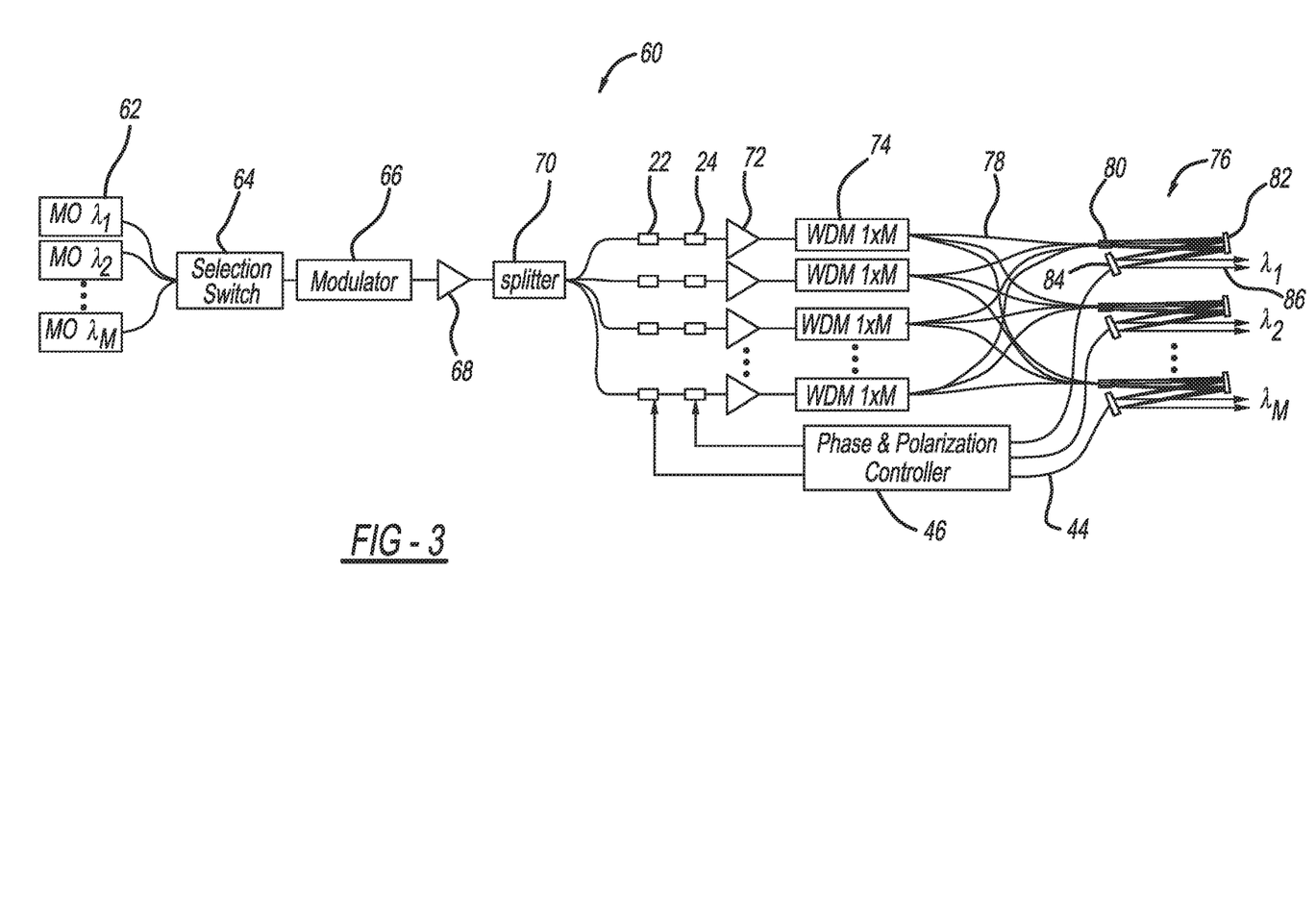
FIG. 3 is block diagram of a fiber laser amplifier system employing wavelength division multiplexers (WDMs) and CBC beam directors.

FIG. 3 is a schematic block diagram of a fiber laser amplifier system 60, where like elements to the system 50 are identified by the same reference number. The system 60 includes an array of M number of low power MO laser seed beam sources 62 each generating a seed beam at a distinct and separate wavelength $\lambda_j$ where j=1 ... M. A selection switch 64 is switched to select one of the MO wavelengths $\lambda_j$ for transmission based on which of a plurality of spaced apart beam directors (discussed below) will output the beam to provide the desired beam direction. The selected seed beam is then phase-modulated by a phase modulator 66, pre-amplified by an amplifier 68 and split by a splitter 70 to provide a fiber seed beam to laser fiber amplifiers 72 in N number of fiber channels. A typical high power fiber laser amplifier of this type used to feed SBC or CBC architectures typically comprises several gain stages of Yb-doped fiber amplifiers pumped by laser diodes (not shown) and separated by optical isolators (not shown). Wavelength tuning ranges for custom, multi-stage kilowatt-class Yb-doped fiber amplifiers are often 30-40 nm with minimal impact to efficiency.

The system 60 includes a separate passive WDM 74 for each of the laser amplifiers 72 that receives the amplified beam therefrom, and depending on the wavelength $\lambda$ of the seed beam that is selected by the switch 64, the amplified beam will be output from the WDM 74 onto a particular one of M number of delivery fibers 78. In other words, the WDMs 74 are wavelength selective devices that direct the beam to one of a plurality of outputs depending on its wavelength. The wavelength spacing $\delta\lambda$ between the output ports of the WDMs 74 is identical to the wavelength spacing $\delta\lambda=\lambda_j-\lambda_{j-1}$ between the seed sources 62. Each separate delivery fiber 78 at the output of each WDM 74 is coupled to a different CBC beam combiner director 76 so that at any particular point in time the beams from all of the WDMs 74 are sent to the same beam director 76 depending on the selected wavelength $\lambda$ to provide the desired high power level and output beam direction. Thus, depending on which direction the system 60 is to send the output beam, the selection switch 64 selects the particular beam from the seed sources 62 so that the required beam director 76 receives all of the amplified beams.

As with the system 50 discussed above, each beam director 76 includes a fiber launcher array 80 that re-directs all of the beams from the delivery fibers 78, a CBC diffractive element 82 that coherently combines the beams from the array 80, and a beam sampler 84 that samples a portion of the combined beam, which is coupled into the sample fiber 44 and is then provided to the multichannel phase and polarization controller 46, which controls the phase modulators 22 and the polarization modulators 24, where the beam sampler 84 reflects most of the power in the coherently combined beam as a high power output beam 86. Hence, by adjusting the low power wavelength-selective switch 64, the amplified laser beam can be switched between any of the beam directors 76. Although the beam directors 76 include the CBC diffractive element 82 in this embodiment, other embodiments may employ other types of CBC elements that arrange the amplified beams from the WDMs 74 in a close-packed geometry.

The WDMs 74 can be any suitable optical device that receives an optical input beam and outputs the beam on one of several output ports depending on the wavelength of the input beam. For example, WDM components based on fused biconic fiber tapers can be used for the WDMs 74 and are well known in the art. However, these types of optics typically operate at relatively modest powers, such as <1-10 W, and commercial components cannot be spliced to the outputs of kW-fiber amplifiers. However, an unpackaged 100 W WDM based on tapered fibers has recently been demonstrated.

Figure 4:
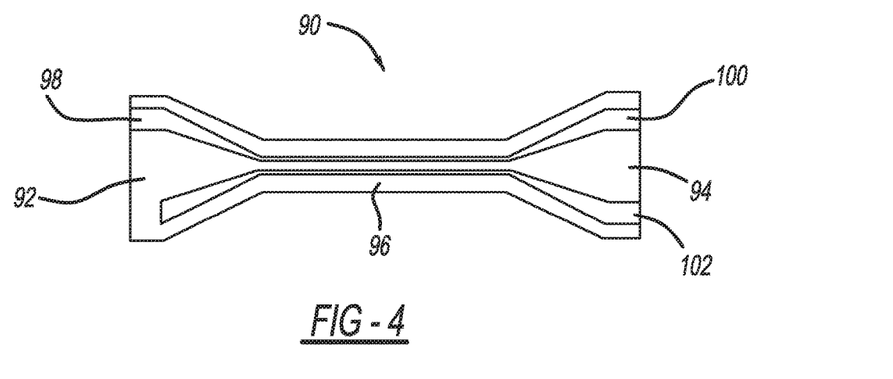
FIG. 4 is an illustration of a WDM employing a fused biconic fiber taper element.

FIG. 4 is an illustration of a known fused biconic tapered fiber WDM 90 including a tapered input end 92, a tapered output end 94 and a narrow portion 96 therebetween. An input beam provided to an input port 98 at the input end 92 propagates into the narrow portion 96 and is output on a specific output port 100 or 102 depending on the geometry and refractive indices of the fiber waveguide in the narrow portion 96 and the wavelength of the beam.

TFB couplers for coherent beam combining and splitting applications have been demonstrated in the art at multi-kilowatt power levels when directly spliced to kW amplifier outputs. This core fabrication technology and approach can be modified to manufacture tapered WDMs that can be used as the WDMs 74. The basic concept is to bundle together a number of large mode area fibers that are mode-matched to an output pigtail from a kW fiber amplifier, and down-taper until light evanescently couples between the cores. By tuning the interaction length, a spectrally selective WDM component can be provided. If the fibers are dual clad, most of the scattered light, which could cause thermal damage at high power, can be contained within the outer cladding of the output port fibers to prevent heat deposition in the component package.

Another approach to realize a kW-class WDM could include using volume Bragg gratings (VBGs). It is straight forward to holographically multiplex multiple gratings in the same substrate to realize 1×M WDMs in cm-class material thicknesses, which have been shown to be capable of kW class power handling with some limits from thermal effects arising from trace absorption on the order of about 100 ppm/cm at 1-µm laser wavelengths in the thick photothermorefractive glass medium. Because these are free-space components, the use of VBGs as WDMs would require fiber-free space-fiber coupling with low loss, which is technically possible.

Another approach to realize a kW-class WDM could include using multi-layer dielectric coated dichroic beam-splitter optics. Dielectric-coated beam-splitters can be designed and fabricated to separate wavelengths separated by only a few nanometers. Because these are free-space components, the use of dielectric-coated dichroic beam-splitters as WDMs would require fiber-free space-fiber coupling with low loss, which is technically possible.

Another approach to realize a kW-class WDM could include using multilayer dielectric diffraction gratings. Multilayer dielectric diffraction gratings are commonly used as combining elements for SBC laser systems and have adequate power handling and dispersion to function as kW-class WDMs. Because these are free-space components, the use of multilayer dielectric diffraction gratings as WDMs would require fiber-free space-fiber coupling with low loss, which is also technically possible.

For some of the component-level approaches that provide a kW-class WDM as described above, and in particular those using TFBs or dielectric beam-splitters, an implementation of a "binary" configuration of the optical element with M=2 output ports rather than M greater than two output ports may be a better approach. Multiple binary components can be assembled to create a functional 1×M WDM in a manner well understood by those skilled in the art.

Figure 5:
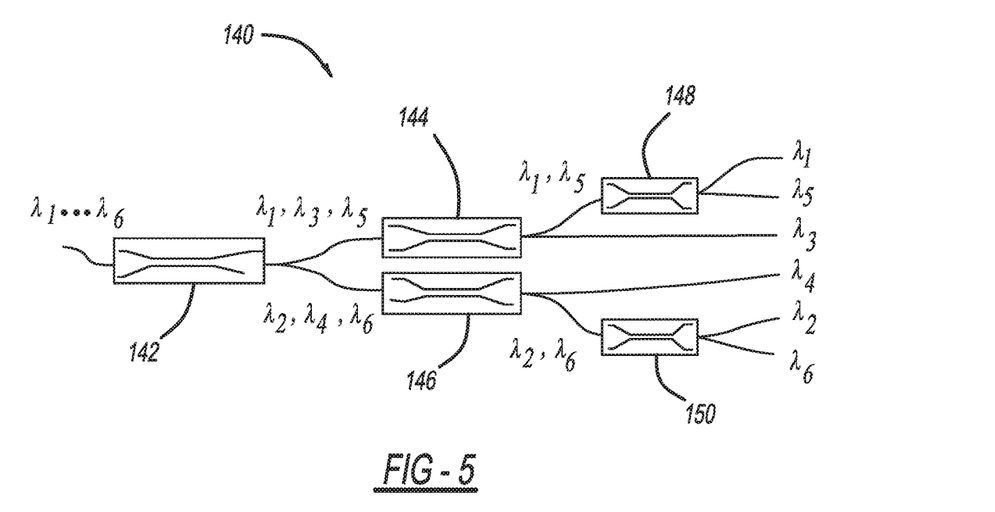
FIG. 5 is an illustration of a WDM employing multiple fused biconic fiber taper elements.

FIG. 5 is an illustration of a binary implemented WDM 140 showing an example of this embodiment. The WDM 140 includes several tapered fiber elements each being similar to the WDM 90. Particularly, a first tapered fiber element 142 receives six beams having different wavelengths $\lambda_1$-$\lambda_6$ on a single input port and outputs on two output ports three combined beams $\lambda_1$, $\lambda_3$, $\lambda_5$ sent to a second tapered fiber element 144 and three combined beams $\lambda_2$, $\lambda_4$, $\lambda_6$ sent to a third tapered fiber element 146. The element 144 outputs two beams $\lambda_1$, $\lambda_5$, on one output port and one beam $\lambda_3$ on another output port, where the two beams $\lambda_1$, $\lambda_5$ are sent to a fourth tapered fiber element 148, and where the two beams $\lambda_1$, $\lambda_5$ are separately output from the element 148. Likewise, the element 146 outputs two beams $\lambda_2$, $\lambda_6$, on one output port and one beam $\lambda_4$ on another output port, where the two beams $\lambda_2$, $\lambda_6$ are sent to a fifth tapered fiber element 150, and where the two beams $\lambda_2$, $\lambda_6$ are separately output from the element 150.

Figure 6:
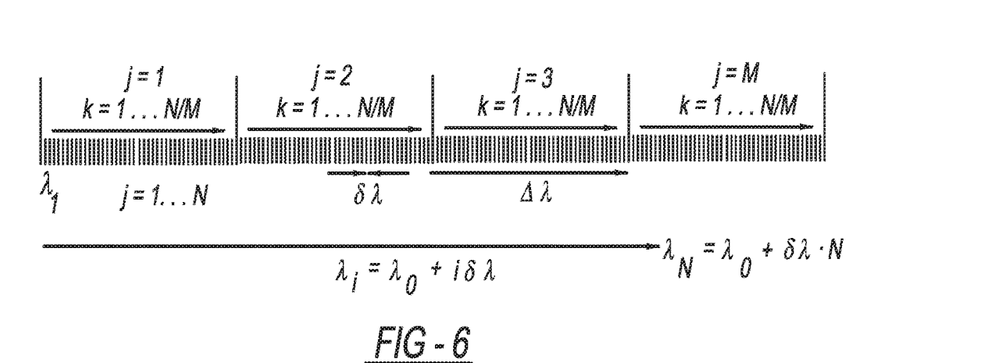
FIG. 6 is a wavelength plan for an SBC architecture.

The wavelength-switched WDMs described above are also compatible with SBC-based beam combiners to provide a high power output beam to one of a plurality of beam directors. FIG. 6 is a wavelength plan for an SBC architecture, where the nomenclature shown in FIG. 6 is used in the discussion below. An SBC architecture typically requires combining an array of N individual laser channels into a single beam using a high-dispersion diffraction grating. Each laser channel operates at a distinct wavelength $\lambda_i = \lambda_o + i*\delta\lambda$, where i=1 . . . N and $\delta\lambda = \lambda_i - \lambda_{i-1}$ is the wavelength spacing between the channels. To achieve the highest power, it is desirable to fit as many channels as possible into the laser tuning range, hence $\delta\lambda$ is typically made as small as practical given geometric and optical component constraints. Given the technological limitations of WDM components, the required wavelength shift $\Delta\lambda$ between WDM output ports is typically much larger than the wavelength spacing $\delta\lambda$ between adjacent laser channels. Effective switching between M number of WDM output ports requires the laser channels to be grouped in N/M sets of M laser channels, where the lasers within each channel are separated in wavelength by at least $\Delta\lambda = N/M \cdot \delta\lambda$.

With this described channel grouping, a wavelength-switched SBC laser system can be provided. Within each of the k=1 . . . M/N groups, there are j=1 . . . M discrete wavelength MO seed sources whose beam wavelengths are spaced from the others in the same group k by at least the WDM port spacing $\Delta\lambda$. The set of M number of MO seed beams are fed to the input ports of an M×M interconnect switch, which can be user-adjusted to route each input to any of the M outputs. Each of the M seed beams seeds a high power fiber laser amplifier channel. Each channel's amplified output is spliced to a passive WDM optical element with one input and M outputs. Within any given group k, the WDM elements are identical, i.e., they have the same wavelength set-points for each laser channel within the group, but the WDM elements are different compared to the other groups. Each WDM routes the beam based on its wavelength to the desired director at the proper location in the array. The input to a WDM located in the $k^{th}$ combined group can be switched between M different wavelengths $\lambda_{k+(j-1)N/M}$, where j=1 . . . M. The wavelength spacing internal to the group is $\Delta\lambda = N/M \delta\lambda$ to be compatible with a coarse-resolution WDM. Hence, by adjusting the low power interconnect switches within each group k, the amplified light can be switched between any of the M number of beam director outputs.

Figure 7:
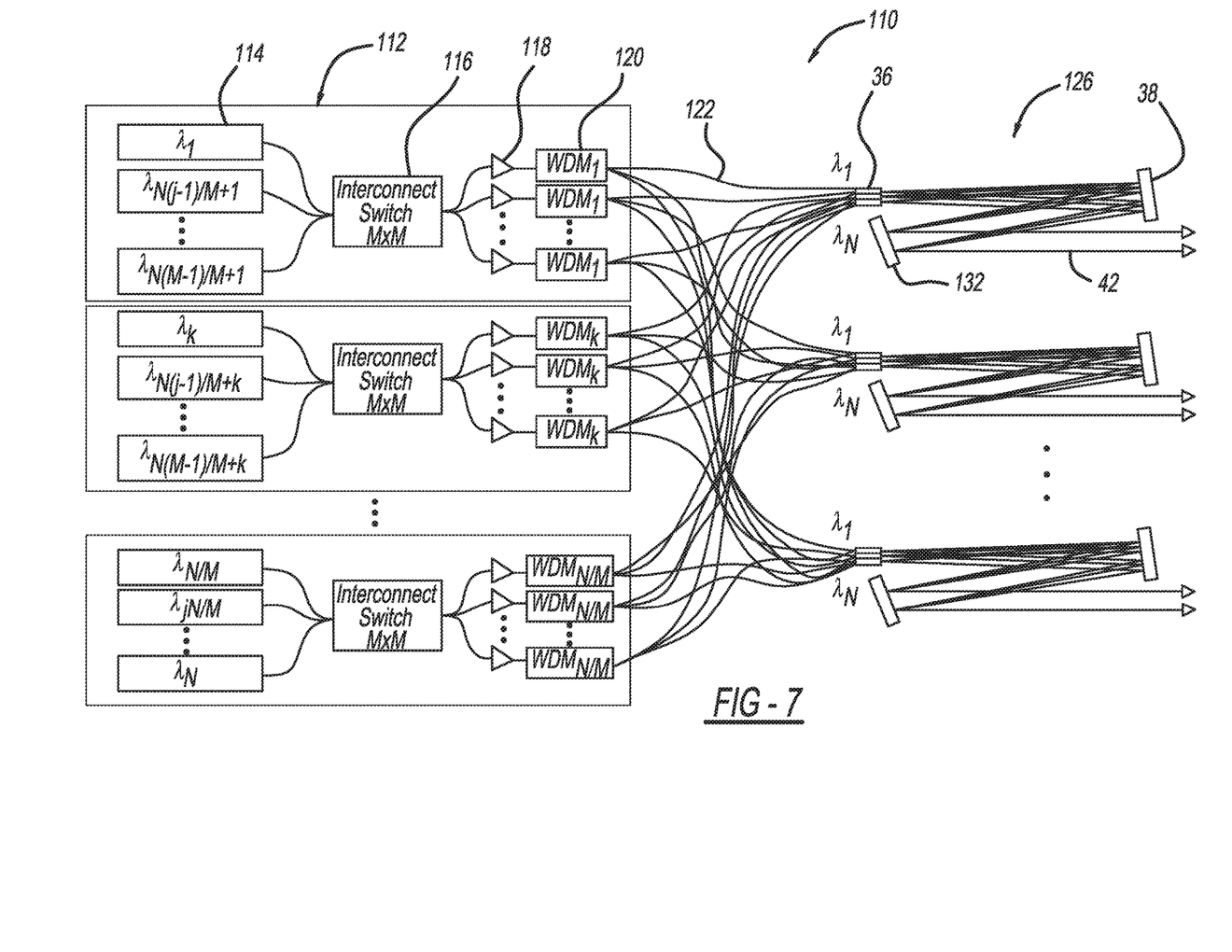
FIG. 7 is a fiber laser system amplifier system employing WDMs and SBC beam directors.

FIG. 7 is a schematic block diagram of a fiber laser amplifier system 110 that employs SBC in the manner described above, where like elements to the system 10 are identified by the same reference number. The system 110 includes N/M number of group sub-systems 112 so that each sub-system 112 includes M number of MO seed beam sources 114 for a total of N number of seed sources or laser channels in all of the sub-systems 112, where all of the seed sources 114 in all of the group sub-systems 112 operate at a different wavelength $\lambda$. Each different wavelength seed beam from each seed source 114 in each sub-system 112 is sent to an M×M interconnect switch 116 that determines which one of the seed beams from the seed sources 114 will be sent to which one of M number of fiber laser amplifiers 118. In other words, each of the seed beams from the seed sources 114 is sent to one of the fiber amplifiers 118, where it is the setting of the interconnect switch 116 that determines which one. It is noted that each seed beam output from the interconnect switch 116 would also be phase modulated and pre-amplified as in the system 60 prior to being sent to the amplifier 118. The output of each fiber amplifier 118 is provided to a separate WDM 120, where the wavelength of the beam determines which one of M number of delivery fibers 122 the amplified beam from the WDM 120 will be provided on. Each of the WDMs 120 in each group sub-system 112 operates in the same manner, where each group of the WDMs 120 in each different sub-system 112 operates for the set of wavelengths in that group.

Each delivery fiber 122 coupled to the output of each of the WDMs 120 is also coupled to a different one of M number of beam directors 126. The beam directors 126 include the same basic components as the beam directors 34 including the SBC grating 38 that spatially combines the beams having the different wavelengths, but where the beam sampler 40 has been replaced with re-directing optics 132 because the beams are not sampled for phase and polarization control. The delivery fibers 122 are coupled to the WDMs 120 and the beam directors 126 so that for each setting of the interconnect switches 116 and the wavelength selection of the WDMs 120, the particular beam from every WDM 120 in every sub-system 112 will be sent to the same beam director 126 so that beam director 126 receives all of the wavelengths $\lambda_1 \ldots \lambda_N$ to provide a high power output beam. In other words, the system 110 is designed so that if a high power output beam is desired from a particular beam director 126, the interconnect switches 116 will select which WDM 120 will receive which wavelength amplified beam, and each WDM 120 is configured so that it outputs that beam on the proper delivery fiber 122 for the desired beam director 126.

The fiber laser amplifier systems discussed above have particular application for high power systems, such as laser weapon systems. However, the above-described architecture also has relevance to single-mode laser machining or processing applications to provide directed energy. It is common in the art for laser material processing to switch multimode (low brightness) kW-class fiber laser power between multiple workstations using multimode deliver fibers. If instead kW-class single mode laser power could be switched it could enable a larger array of machining processes that could benefit from multiple beam formats or combiners. This would be applicable to various industrial applications, such as additive manufacturing, welding of dissimilar materials, and in-situ annealing/welding and/or cutting. Switched single mode kW sources will also improve standoff distances between the laser head and the work-piece compared with multimode switched fiber lasers. The architecture for switching could employ a single wavelength switched amplifier having a single WDM element that selectively routs a beam to multiple workstations.

Figure 8:
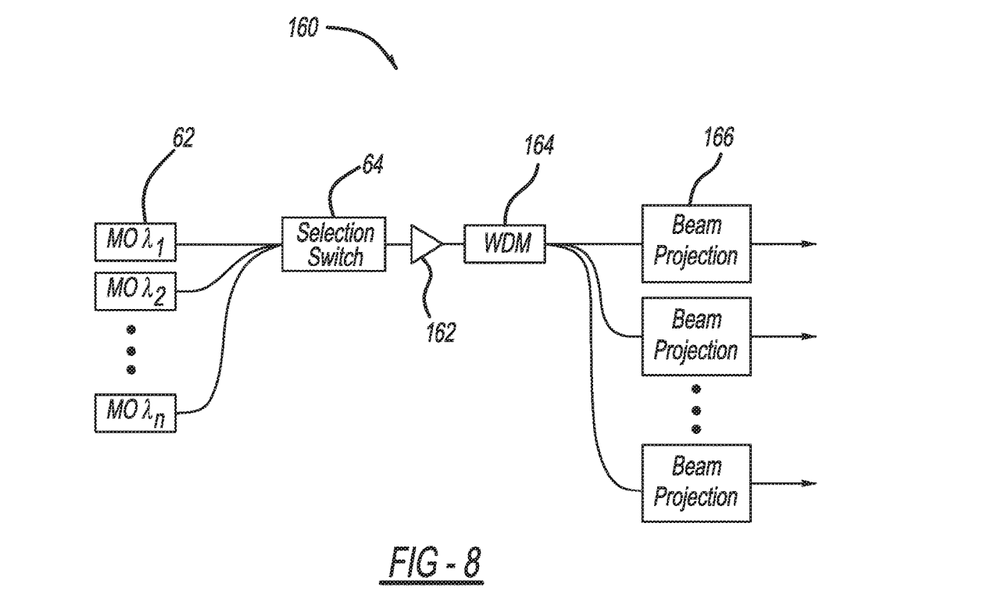
FIG. 8 is block diagram of a fiber laser amplifier system employing a WDM and multiple beam directors.

FIG. 8 is a schematic block diagram of a fiber laser amplifier system 160 showing one non-limiting example of this design, where like elements to the system 60 are identified by the same reference number. Instead of employing multiple fiber amplifiers and multiple WDMs, the system 160 only includes a single fiber amplifier 162 that amplifies the selected seed beam from the sources 62 and a single WDM 164 that directs the amplified beam to one of M number of beam projectors 166 depending on the wavelength of the selected seed beam.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fiber amplifier system comprising:
   a plurality of seed beam sources each generating a seed beam at a different wavelength;
   a selection switch receiving the seed beams from the plurality of seed beam sources and outputting a selected one of the seed beams;
   a beam splitter that splits the selected seed beam into a plurality of amplification channels;
   a fiber amplifier in each amplification channel that receives a split selected beam from the beam splitter, each fiber amplifier amplifying the split selected beam;
   a wavelength division multiplexer (WDM) in each amplification channel that each receives an amplified selected beam from one of the fiber amplifiers and outputs the amplified selected beam to one of a plurality of delivery fibers depending on the wavelength of the selected beam; and
   a plurality of beam directors each being coupled to a delivery fiber from each WDM, wherein a particular one of the plurality of beam directors receives the amplified selected beams on the delivery fibers from all of the WDMs depending on the selected seed beam, each beam director combining the amplified beams into a combined output beam.

2. The system according to claim 1 wherein the number of seed beam sources is the same as the number of beam directors.

3. The system according to claim 1 wherein each of the plurality of beam directors includes a coherent beam combining (CBC) grating element for combining the amplified selected beams from the WDMs.

4. The system according to claim 1 wherein each of the plurality of beam directors includes coherent beam combining (CBC) optics for arranging the amplified selected beams from the WDMs into a close-packed geometry.

5. The system according to claim 1 wherein the number of the amplification channels is greater than the number of the seed beam sources and the number of beam directors.

6. The system according to claim 1 wherein the plurality of fiber amplifiers are Yb-doped fiber amplifiers.

7. The system according to claim 1 wherein the WDMs are an assembly of multiple wavelength-selective components.

8. The system according to claim 1 wherein the WDMs are selected from one or a combination of the group consisting of fused biconic tapered fiber optical elements, tapered fiber bundle (TFB) couplers, volume Bragg gratings, dielectric coated dichroic beam-splitters and diffraction gratings.

9. A fiber amplifier system comprising:
   a plurality of group sub-systems each including a plurality of seed beam sources where each seed beam source in all of the sub-systems generates seed beams at different wavelengths;
   a plurality of interconnect switches where a single interconnect switch is provided in each group sub-system, wherein each interconnect switch in each sub-system receives the seed beams from the plurality of seed sources in that sub-system and selectively directs each of the seed beams to a particular output of the switch where the interconnect switch outputs the same number of seed beams as it inputs;
   a plurality of fiber amplifiers in each sub-system where each fiber amplifier receives one of the seed beams from the interconnect switch based on the selection of the interconnect switch, each fiber amplifier amplifying the seed beam;
   a plurality of wavelength division multiplexers (WDM) in each sub-system, each WDM receiving an amplified beam from one of the fiber amplifiers, each WDM outputting the amplified beam on one of a plurality of delivery fibers depending on the wavelength of the amplified beam; and
   a plurality of beam directors where each beam director is coupled to a delivery fiber from each of the WDMs in each of the sub-systems so that a particular one of the beam directors receives all of the amplified beams from all of the WDMs depending on how the interconnect switches select which fiber amplifier receives which seed beam, each beam director combining the amplified beams into a combined output beam.

10. The system according to claim 9 wherein there are N number of seed beam sources in all of the sub-systems, M number of seed beam sources in each sub-system, M number of fiber amplifiers in each sub-system, M number of beam directors, and N/M number of sub-systems.

11. The system according to claim 9 wherein each WDM in each sub-system operates in the same manner.

12. The system according to claim 9 wherein each of the plurality of beam directors includes a spectral beam combining (SBC) element for combining the amplified beams from the WDMs.

13. The system according to claim 9 wherein the plurality of fiber amplifiers are Yb-doped fiber amplifiers.

14. The system according to claim 9 wherein the WDMs are selected from one or a combination of the group consisting of fused biconic tapered fiber optical elements, tapered fiber bundle (TFB) couplers, volume Bragg gratings, dielectric coated dichroic beam-splitters and diffraction gratings.

15. A fiber amplifier system comprising:
   a plurality of seed beam sources each generating a seed beam at a different wavelength;

a seed beam selection switch receiving the seed beams from the plurality of seed sources and selectively outputting one or more of the seed beams on one or more outputs;

at least one fiber amplifier receiving one of the selected seed beams from the selection switch, said at least one fiber amplifier amplifying the selected seed beam;

at least one wavelength division multiplexer (WDM) receiving the amplified selected seed beam from the at least one fiber amplifier, said at least one WDM providing the amplified beam on a separate output depending on the wavelength of the selected beam; and a plurality of beam directors each receiving at least one of the amplified beams from the at least one WDM depending on the selected seed beam, and providing an output beam.

16. The system according to claim 15 wherein the at least one fiber amplifier is a plurality of fiber amplifiers each receiving one of the selected seed beams from the selection switch and the at least one WDM is a plurality of WDMs where a separate WDM receives an amplified beam from a fiber amplifier.

17. The system according to claim 16 wherein the seed beam selection switch selectively outputs all of the seed beams on multiple outputs, and wherein each of the plurality of beam directors includes a spectral beam combining (SBC) element for combining the amplified beams from the plurality of WDMs.

18. The system according to claim 16 wherein the seed beam selection switch selectively outputs one of the seed beams, and wherein each of the plurality of beam directors includes a coherent beam combining (CBC) element for combining the amplified beams from the plurality of WDMs.

19. The system according to claim 15 wherein the WDM is selected from one or a combination of the group consisting of fused biconic tapered fiber optical elements, tapered fiber bundle (TFB) couplers, volume Bragg gratings, dielectric coated dichroic beam-splitters and diffraction gratings.

20. The system according to claim 15 wherein the at least one WDM is an assembly of multiple wavelength-selective components.

* * * * *